United States Patent [19]
Rudert et al.

[11] 4,205,527
[45] Jun. 3, 1980

[54] EXHAUST MANIFOLD

[75] Inventors: Wolfgang Rudert, Langenargen; Karl-Heinz de Lazzer, Friedrichshafen; Gerhard Haussmann, Friedrichshafen; Dieter Wünsche, Friedrichshafen, all of Fed. Rep. of Germany

[73] Assignee: Motoren-und Turbinen-Union Friedrichshafen GmbH, Friedrichshafen, Fed. Rep. of Germany

[21] Appl. No.: 854,399

[22] Filed: Nov. 23, 1977

[30] Foreign Application Priority Data

Nov. 24, 1976 [DE] Fed. Rep. of Germany ....... 2653263

[51] Int. Cl.$^2$ ............................ F01N 7/06; F01N 7/10
[52] U.S. Cl. ........................................ 60/321; 60/322; 60/323
[58] Field of Search ................. 60/321, 322, 323, 280; 123/52 M; 285/137 R, 166, 131

[56] References Cited
U.S. PATENT DOCUMENTS

| 2,678,529 | 5/1954 | Buchi | 60/321 |
| 2,886,945 | 5/1959 | Hofer | 60/321 |
| 3,043,094 | 7/1962 | Nichols | 60/323 |
| 3,485,040 | 12/1969 | Niskanen | 60/321 |
| 3,652,108 | 3/1972 | Coats | 285/165 |
| 3,775,979 | 12/1973 | Scheitlin et al. | 60/323 |
| 3,888,081 | 6/1975 | Fitis | 123/52 M |
| 4,060,982 | 12/1977 | Konishi et al. | 60/323 |

FOREIGN PATENT DOCUMENTS

| 503944 | 6/1954 | Canada | 60/323 |
| 2145612 | 3/1973 | Fed. Rep. of Germany | 60/280 |

Primary Examiner—Douglas Hart
Attorney, Agent, or Firm—Craig & Antonelli

[57] ABSTRACT

An exhaust manifold for a supercharged internal combustion engine which includes inner pipes carrying the exhaust gases from the engine and a water-cooled housing surrounding the inner pipes at a predetermined spacing. The housing is mounted to exhaust gas flanges of the internal combustion engine by way of water-cooled intermediate flanges. The housing includes an opening on a side thereof facing away from the engine with the opening extending approximately over the entire length of the housing and being closable in a gas-tight fashion by a cover. The housing is bolted to the exhaust gas flanges from the inside thereof and the inner pipes are formed of individual pipe segments assembled with plug connections with the length of the various pipe segments corresponding approximately to the cylinder spacing of the internal combustion engine.

5 Claims, 4 Drawing Figures

EXHAUST MANIFOLD

The present invention relates to a manifold arrangement and, more particularly, to an exhaust manifold for a multi-piston internal combustion engine with the exhaust manifold including inner tubes or pipes for conducting exhaust gases from the internal combustion engine and a water-cooled housing surrounding the inner tubes or pipes at a predetermined spacing with the housing being mounted on exhaust flanges of the internal combustion engine and forming at the mounting areas cooled intermediate flanges for the inner tubes or pipes of the exhaust manifold.

Exhaust manifolds between an internal combustion engine and an exhaust gas turbocharger are provided for the protection of hot exhaust gases from energy losses resulting from heat radiation and convection and also to maintain outside temperature of the exhaust manifold the same as that of the internal combustion engine housing with a distance between pipes or tubes of the exhaust manifold and the engine housing serving as an insulation so as to moderate a load on the cooling system of the internal combustion engine.

Various designs of exhaust manifolds for an internal combustion engine have been proposed; however, the construction of the proposed exhaust manifolds is relatively costly and installation of the manifolds may only be accomplished with considerable difficulty. Moreover, a sealing problem between the exhaust gas flange of the internal combustion engine and the inner pipes results which cannot satisfactorily be solved. Additionally, the proposed exhaust manifolds pay little, if any, attention to any length adjustments between the outer housing and inner pipes which result by virtue of the differences in temperature between the respective elements.

The aim underlying the present invention essentially resides in providing an exhaust manifold for a multi-cylinder internal combustion engine which can be economically mass-produced and which permits a simple check of the inner pipes of the exhaust manifold during a normal maintenance operation.

According to advantageous features of the present invention, a housing is provided which has an opening on a side thereof facing away from the internal combustion engine. The opening extends over the length of the housing with a cover being provided for covering the opening in a gas-tight fashion. The housing is fastened by, for example, a bolt or screw connection to exhaust gas flanges of the internal combustion engine from the inside of the housing with the inner pipes of the exhaust manifold being constructed as individual tube segments assembled by plug connections. The individual tube segments have lengths approximately corresponding to a spacing between the cylinders of the internal combustion engine with the pipes being fastened, if necessary, by flanged elbows, which elbows are welded to the tube segments or sections. The flanges of the elbows are mounted on cooled intermediate flanges of the exhaust manifold housing.

Since the exhaust manifold housing and the internal combustion engine housing are approximately at the same temperature because of cooling, in accordance with the present invention, by using appropriate material in both the exhaust manifold housing and the internal combustion engine housing, such as, for example, aluminum casting or gray iron casting, a lengthwise or thermal expansion which occurs during a heating of the housings will be the same. Therefore, the appropriate flange connections can be made rigid and absolutely tight thereby and a water-cooling of the housing is possible. Additionally, since the inner tube sections or segments of the inner exhaust manifold are exposed to very high operating temperatures, by virtue of the use of plug connections between the tube sections or segments, it is possible to allow an unimpeded length adjustment of the inner exhaust manifolds.

According to further advantageous features of the present invention, the plug connections between the tube or pipe sections may be formed by simple expansion of one end of the respective tube or pipe sections such that one end has a cylindrical configuration with the other end thereof having a spherical configuration with the spherical end of one pipe or tube section being received in a cylindrical section of an immediately adjacent pipe or tube section. By such a construction, seals can be eliminated because any leaks which may appear between the respective pipe sections will be handled by the tightly sealed housing until an appropriate pressure has built up in the space between the inner pipes or tubes and the exhaust manifold housing, which pressure would then prevent further leaks. More specifically, escaping exhaust gases from the joints of the respective tube or pipe sections results in a pressure build-up in the tightly sealed housing. When there exists a pressure equilibrium inside and outside of the tube or pipe sections, no further escaping exhaust gases will occur at the plug connections.

According to yet further features of the present invention, two sets of tubes or pipe segments are arranged in a parallel relationship on respective sides of the exhaust openings in a cylinder head of the internal combustion engine with the tube or pipe segments of one set communicating with some of the exhaust openings and the tube or pipe segments of the other set communicating with the remaining exhaust openings by the flanged elbows with the communication of the respective sets being determined by the supercharging requirements and firing order of the internal combustion engine and with means being provided for firmly connecting at least some of the adjacent tube sections in the respective sets of the tube or pipe segments forming the inner exhaust manifolds. By virtue of this arrangement, a reliable fastening of the various inner pipe sections is ensured, even when a tube segment or section has no connection with the next exhaust gas flange of the internal combustion engine.

According to the present invention, a flange is provided at one end of the housing, to which flange an exhaust gas turbocharger is mounted, whereby it is possible to eliminate brackets and intermediate pipes for mounting the exhaust gas turbocharger.

In accordance with yet another feature of the present invention, an intermediate flange is mounted between the flange of the exhaust manifold housing for mounting the exhaust gas turbocharger and a corresponding flange of the exhaust gas turbocharger with a last tube section or segment of the inner exhaust gas manifold being welded to the intermediate flange, whereby a favorable design of exhaust manifold results which can be installed in finished form without the exhaust gas turbocharger and yet permit the exhaust gas turbocharger to be retrofitted in a simple manner.

Accordingly, it is an object of the present invention to provide an exhaust gas manifold for a multi-cylinder internal combustion engine which avoids by simple means the shortcomings and disadvantages encountered in the prior art.

Another object of the present invention resides in providing an exhaust gas manifold for a multi-cylinder internal combustion engine wherein the exhaust gas manifold housing may easily be connected to exhaust gas flanges of the internal combustion engine and wherein a mounting, attachment and checking of inner pipes or tubes of the exhaust manifold can be carried out in a simple fashion through an opening of the exhaust gas manifold housing during a normal maintenance operation.

A further object of the present invention resides in providing an exhaust gas manifold for a multi-cylinder internal combustion engine wherein, in the event repairs are required, individual segments of the inner exhaust manifolds can be replaced through an opening in the exhaust gas manifold housing without removing an exhaust gas turbocharger from the engine.

Yet another object of the present invention resides in providing an exhaust gas manifold for a multi-cylinder internal combustion engine which functions reliably under all operating conditions.

A still further object of the present invention resides in providing an exhaust gas manifold for a multi-cylinder internal combustion engine which is simple in construction and therefor inexpensive to manufacture.

These and other objects, features and advantages of the present invention will become more apparent from the following description when taken in connection with the accompanying drawings which show, for the purposes of illustration only, one embodiment in accordance with the present invention, and wherein.

Figure 1:
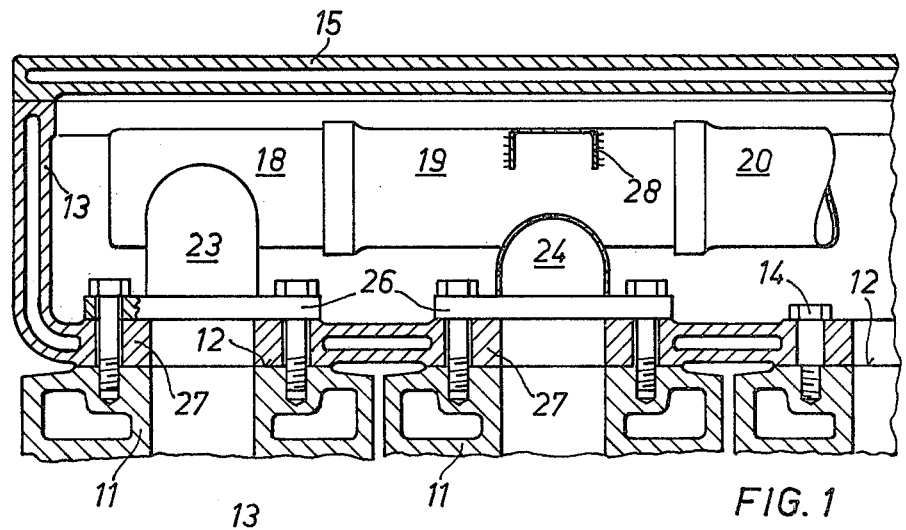
FIG. 1 is a longitudinal cross-sectional view of a water-cooled exhaust gas manifold housing in accordance with the present invention.
Figure 2:
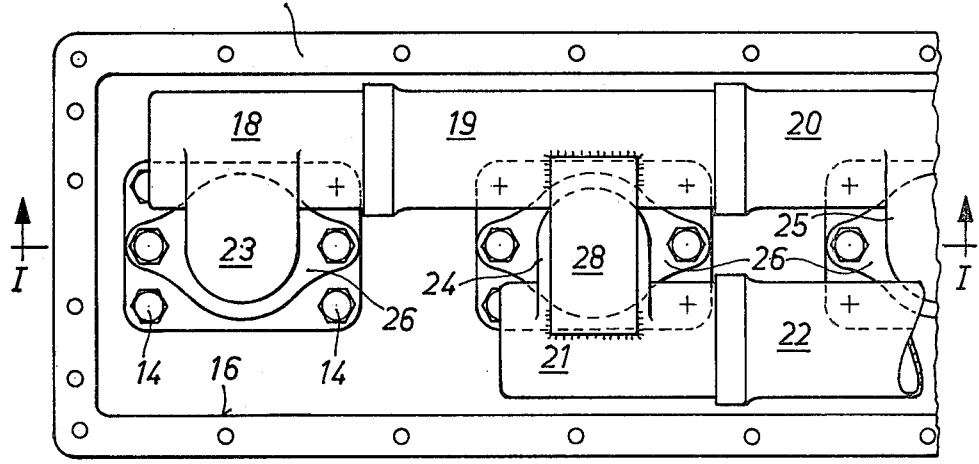
FIG. 2 is a top view of an exhaust manifold of an internal combustion engine with a housing cover removed therefrom.

Referring now to the drawings wherein like reference numerals are used throughout the various views to designate like parts and, more particularly, to FIGS. 1 and 2, according to these figures, a water-cooled housing 13 is bolted from an inside thereof to exhaust flanges 12 of individual cylinder heads 11 of a piston internal combustion engine. An opening 16 is provided in the housing 13 on a side thereof facing away from the head 11 of the internal combustion engine. The opening 16 extends over a length of the housing 13 with a cover 15 being provided for closing the opening 16 in a gas-tight manner.

Figures 3, 4:
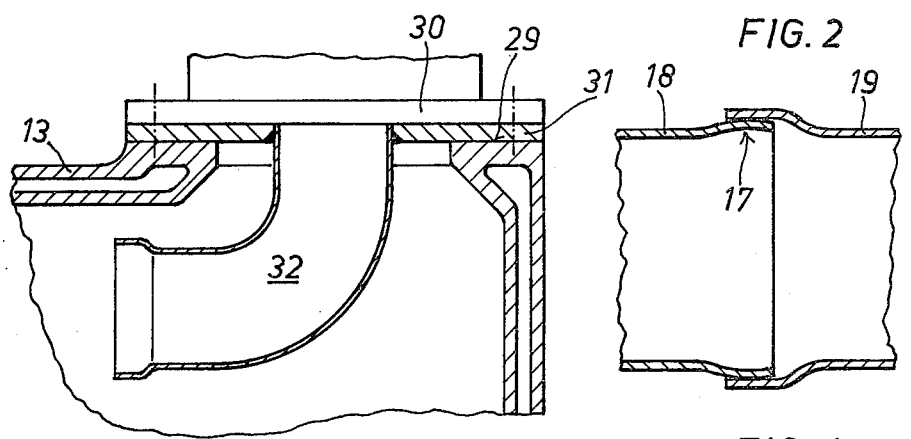
FIG. 3 is a cross-sectional view of a flange connection of an exhaust gas turbocharger of an internal combustion engine at the exhaust gas manifold housing.
FIG. 4 is a partial cross-sectional view of a plug connection of tube sections or segments of the inner pipes of an exhaust manifold constructed in accordance with the present invention.

Inner pipes are provided in the housing 13, which pipes comprise individual pipe sections 18, 19, 20, 21, 22 which are respectively connected to each other by plug connections generally designated by the reference numeral 17 (FIG. 4). According to the supercharging requirements and the firing order of the individual cylinders, for example, tube sections 18, 20 and 21 can be fastened by elbows 23, 25 and 24, respectively, welded to the pipe sections with each of the elbows 23–25 being provided with flanges 26 arranged on cooled intermediate flanges 27 of the housing 13.

U-shaped brackets 28 are provided for firmly connecting adjacent tube sections 19, 21 or 20, 22 with a flange 29 (FIG. 3) being provided at one end of the housing 13 for mounting an exhaust gas turbocharger (not shown) with an intermediate flange 31 being provided between flange 30 of the exhaust gas turbocharger and a flange 29. A last tube section or segment 32 of the inner pipes of the exhaust gas manifold is welded to the intermediate flange 31.

While we have shown and described only one embodiment in accordance with the present invention, it is to be understood that the same is not limited thereto, but is susceptible of numerous changes and modifications as are known to one of ordinary skill in the art to which it pertains, and we therefor do not wish to be restricted to the details shown and described herein, but intend to cover all such changes and modifications as are encompassed by the scope of the appended claims.

We claim:

1. An exhaust manifold for a supercharged multicylinder piston internal combustion engine, the exhaust manifold comprising:

inner pipe means for carrying exhaust gases from the internal combustion engine, a water-cooled housing means for accommodating and for surrounding said inner pipe means at a predetermined spacing, means provided on said housing means for mounting said housing means at exhaust gas flanges of the internal combustion engine, an opening provided in said housing means on a side thereof facing away from the internal combustion engine, said opening extending approximately over an entire length of said housing means, a cover means for sealing said opening in a gas-tight manner, said inner pipe means comprising a plurality of individual pipe segments, each having a length corresponding approximately to a spacing between respective cylinders of the internal combustion engine, and plug connection means for interconnecting adjacent pipe segments so as to form an exhaust pipe line in said housing means, wherein said means for mounting said housing means at exhaust gas flanges includes water-cooled intermediate flanges provided on said housing means, wherein bolt means are provided for securing said housing means to exhaust gas flanges of the internal combustion engine, said bolt means being arranged on an inside of said housing means, wherein elbow means are provided for communicating selected ones of said individual pipe segments with exhaust openings of the internal combustion engine, said elbow means being fixedly secured to an associated pipe segment and being provided with flanges arranged at the water-cooled intermediate flanges of said housing means, wherein said pipe means includes two sets of individual pipe segments arranged in the housing means so as to extend in a parallel relationship with respect to each other, selected individual pipe segments of one of said two sets communicating with selected exhaust openings of the internal combustion engine with selected individual pipe segments of the other of said two sets communicating with remaining exhaust openings of the internal combustion engine, and wherein means are provided for firmly connecting at least some adjacent pipe segments in the respective sets of individual pipe segments.

2. An exhaust manifold according to claim 1, wherein a flange means is provided at one end of said housing means for accommodating a mounting of an exhaust gas turbocharger.

3. An exhaust manifold according to claim 2, wherein an intermediate flange means is provided between said flange means for accommodating a mounting of an exhaust gas turbocharger and a corresponding flange provided on an exhaust gas turbocharger, and wherein a last pipe segment of the individual pipe segments is welded to said intermediate flange means.

4. An exhaust manifold for a supercharged multicylinder piston internal combustion engine, the exhaust manifold comprising:
   inner pipe means for carrying exhaust gases from the internal combustion engine,
   a water-cooled housing means for accommodating and for surrounding said inner pipe means at a predetermined spacing,
   means provided on said housing means for mounting said housing means at exhaust gas flanges of the internal combustion engine,
   an opening provided in said housing means on a side thereof facing away from the internal combustion engine, said opening extending approximately over an entire length of said housing means,
   a cover means for sealing said opening in a gas-tight manner,
   said inner pipe means comprising a plurality of individual pipe segments, each having a length corresponding approximately to a spacing between respective cylinders of the internal combustion engine, and
   plug connection means for interconnecting adjacent pipe segments so as to form an exhaust pipe line in said housing means,
   wherein said pipe means includes two sets of individual pipe segments arranged in the housing means so as to extend in a parallel relationship with respect to each other, selected individual pipe segments of one of said two sets communicating with selected exhaust openings of the internal combustion engine with selected individual pipe segments of the other of said two sets communicating with remaining exhaust openings of the internal combustion engine, and wherein means are provided for firmly connecting at least some adjacent pipe segments in the respective sets of individual pipe segments.

5. An exhaust manifold for a supercharged multicylinder piston internal combustion engine, the exhaust manifold comprising:
   inner pipe means for carrying exhaust gases from the internal combustion engine,
   a water-cooled housing means for accommodating and for surrounding said inner pipe means at a predetermined spacing,
   means provided on said housing means for mounting said housing means at exhaust gas flanges of the internal combustion engine,
   an opening provided in said housing means on a side thereof facing away from the internal combustion engine, said opening extending approximately over an entire length of said housing means,
   a cover means for sealing said opening in a gas-tight manner,
   said inner pipe means comprising a plurality of individual pipe segments, each having a length corresponding approximately to a spacing between respective cylinders of the internal combustion engine, and
   plug connection means for interconnecting adjacent pipe segments so as to form an exhaust pipe line in said housing means,
   wherein a flange means is provided at one end of said housing means for accommodating a mounting of an exhaust gas turbocharger,
   wherein an intermediate flange means is provided between said flange means for accommodating a mounting of an exhaust gas turbocharger and a corresponding flange provided on an exhaust gas turbocharger, and wherein a last pipe segment of the individual pipe segments is welded to said intermediate flange means.

* * * * *